(12) United States Patent
Burwell et al.

(10) Patent No.: US 7,821,417 B2
(45) Date of Patent: Oct. 26, 2010

(54) METHOD AND SYSTEM FOR DETECTING THE PRESENCE OF PARTS IN AN ASSEMBLY FIXTURE

(75) Inventors: Kevin L. D. Burwell, Almer (CA); John D. Kennedy, Morrison (CA)

(73) Assignee: Magna International Inc., Aurora (CA)

( * ) Notice: Subject to any disclaimer, the term of this patent is extended or adjusted under 35 U.S.C. 154(b) by 445 days.

(21) Appl. No.: 11/770,814

(22) Filed: Jun. 29, 2007

(65) Prior Publication Data

US 2008/0122640 A1 May 29, 2008

(51) Int. Cl.
*G08B 21/00* (2006.01)
(52) U.S. Cl. .................. 340/686.5; 340/686.1; 219/119; 219/93
(58) Field of Classification Search ............... 340/686.5, 340/686.1; 219/119, 93
See application file for complete search history.

(56) References Cited

U.S. PATENT DOCUMENTS

| | | | |
|---|---|---|---|
| 3,300,769 A | 1/1967 | Batur | |
| 3,823,285 A * | 7/1974 | Dwyer | 200/81 H |
| 4,479,041 A * | 10/1984 | Fenwick et al. | 200/81 R |
| 4,763,114 A * | 8/1988 | Eidsmore | 340/606 |
| 5,343,753 A | 9/1994 | Boutin | |
| 6,163,004 A * | 12/2000 | Aoyama et al. | 219/93 |
| 6,765,171 B1 * | 7/2004 | Hengel et al. | 219/93 |
| 6,878,897 B1 * | 4/2005 | Landis | 219/119 |

FOREIGN PATENT DOCUMENTS

| | | |
|---|---|---|
| DE | 3608296 A * | 10/1986 |
| JP | 95115203 B2 * | 12/1995 |

\* cited by examiner

*Primary Examiner*—Daniel Wu
*Assistant Examiner*—Naomi Small
(74) *Attorney, Agent, or Firm*—Harness, Dickey & Pierce, P.L.C

(57) ABSTRACT

The present invention provides a system and method of detecting the correct and complete loading of parts in one or more assembly fixtures. A missing or incorrectly loaded part results in an airflow from a respective part cavity in an assembly fixture and a switch assembly, which can be located distal from the assembly fixtures, detects the airflow and provides a signal indicating that the fixture is not correctly loaded. Conversely, if each and every part is correctly loaded into the assembly fixtures, no airflow occurs and the switch assembly outputs a signal indicating that the assembly fixtures are correctly loaded and that subsequent manufacturing/assembly operations can be performed.

16 Claims, 5 Drawing Sheets

METHOD AND SYSTEM FOR DETECTING THE PRESENCE OF PARTS IN AN ASSEMBLY FIXTURE

FIELD OF THE INVENTION

The present invention relates to a system and method for detecting the presence of one or more parts in an assembly fixture. More specifically, the present invention relates to a system and method whereby the presence and correct loading of one or more parts in an assembly fixture, such as a welding fixture, can be reliably confirmed.

BACKGROUND OF THE INVENTION

Many assembly operations require the loading of one or more parts into an assembly fixture, or jig, prior to a subsequent manufacturing step, such as welding. To reduce manufacturing costs, typically the loading of the parts into the assembly fixture is at least partially, if not totally, automated. While such automated loading systems are relatively reliable, their occasional failure in misaligning a part when loading it into the assembly fixture and/or omitting the loading of a part into the assembly fixture altogether can result in lost revenue due to rejected assemblies and/or damage to the assembly fixture.

Accordingly, it is known to employ proximity switches, such a microswitches or the like, within the assembly fixture to confirm the correct loading of the parts. Specifically, the assembly fixture will include a proximity switch for each part to be loaded into the assembly fixture and the actuator arm of the switch will either directly contact the respective part or a mechanical plunger or other intermediate member will contact the part and act against the actuator arm of the switch, to signal that the part is loaded.

While such proximity switch systems work, they suffer from disadvantages in that a separate switch must be employed to detect each part to be loaded into the assembly fixture. While the need for multiple proximity switches increases the cost of the assembly fixture, they also increase the likelihood of downtime as the failure of any one of the multiple switches prevents use of the assembly fixture until the failed switch is replaced and, with several switches present on the assembly fixture, the probability of each switch failing is added to the probability of each other switch failing.

Further, in such prior art systems the proximity switch must either be located close to a respective part, and thus subjected to the hazards of the assembly operations such as heat, chemicals, impacts, etc. during the assembly operation or the above-mentioned plunger or other intermediate member must be employed between the proximity switch and the part location and the plunger or intermediate member is subjected to the above-mentioned hazards and/or other possible mechanical failures These hazards can result in failures of the operation of proximity switches and assembly downtime.

Also, prior art systems employing proximity switches may only be able to detect the presence or absence of a part and may not be able to identify when the part is incorrectly loaded within the assembly fixture.

SUMMARY OF THE INVENTION

It is an object of the present invention to provide a novel method and system for detecting the presence of at least one part loaded in an assembly fixture.

According to a first aspect of the present invention, there is provided a system for detecting the presence of one or more parts in an assembly fixture, comprising: an assembly fixture including at least one cavity to receive and retain parts to be assembled, each of the at least one cavities being complementary in shape to the respective parts they are to receive; a pneumatic circuit connecting the interior of said at least one cavity to an pneumatic inlet; a source of pressurized air; and a switch assembly through which pressurized air from the source passes before entering the pneumatic circuit, the switch assembly having a signal member moveable from a first position to a second position when airflows through the switch assembly when a part is not loaded in, or is incorrectly loaded in, a respective cavity and the switch assembly including a sensor to indicate the presence of the signal member in the second position.

The present invention provides a system and method of detecting the correct and complete loading of parts in an assembly fixture. A missing or incorrectly loaded part results in an airflow from a respective part cavity in the assembly fixture. A switch assembly, which can be located distal from the assembly fixture, detects the airflow and provides a signal indicating that the fixture is not correctly loaded. Conversely, if each and every part is correctly loaded into the assembly fixture, no airflow occurs and the switch assembly outputs a signal indicating that the assembly fixture is correctly loaded and that subsequent manufacturing/assembly operations can be performed. By having the switch assembly located distal the assembly fixture, damage from assembly steps such as welding, impacts, etc. cannot damage the switch assembly. Further, by employing the described pneumatic system on the assembly fixture, an inexpensive, reliable and easily maintained sensing system is achieved. Also, the present invention allows for the detection of the correct loading of multiple parts into an assembly fixture with a single switch assembly, thus reducing costs. Also, the present invention can be employed with multiple assembly fixtures, each having its own respective pneumatic inlet and pneumatic circuit.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
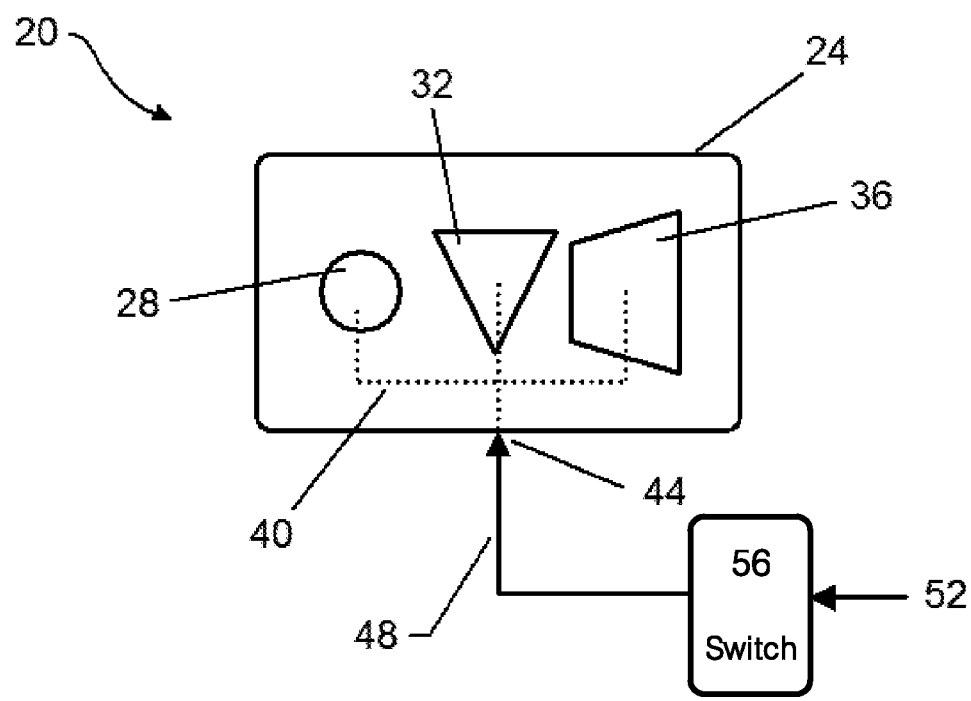
FIG. 1 shows a schematic representation of a first embodiment of an assembly fixture and part detection system in accordance with the present invention.

An assembly fixture and part detection system in accordance with the present invention is indicated generally at 20 in FIG. 1. Assembly fixture and part detection system 20 includes assembly fixture 24 which, in the illustrated embodiment, includes three cavities 28, 32 and 36 to receive appropriate parts and retain those respective parts in a correct position during subsequent assembly operations. As will be apparent to those of skill in the art, the present invention is not limited to operation with assembly fixtures holding three parts and the present invention can in fact be employed with assembly fixtures with more or fewer cavities to hold parts, as desired.

Assembly fixture 24 further includes a pneumatic circuit 40 which connects a pneumatic inlet 44 to an interior portion of each cavity 28, 32 and 36. Pneumatic circuit 40 can be a plenum formed in assembly fixture 24, or tube or hose mounted to assembly fixture 24 or any other suitable means for providing a flow of pressurized air to the interior portions of cavities 28, 32 and 36. Cavities 28, 32 and 36 are complementary in shape to the respective components they receive and, when a respective component is correctly loaded into each respective one of cavities 28, 32 and 36, air flow through pneumatic circuit 40 is inhibited as the loaded parts will prevent airflow from cavities 28, 32 and 36.

Conversely, if a component is missing from one or more of cavities 28, 32 and 36 or if a component is incorrectly loaded into one or more of cavities 28, 32 and 36, air flows through pneumatic circuit 40 and out of the unloaded or incorrectly loaded one or more of cavities 28, 32 and 36.

Figure 2:
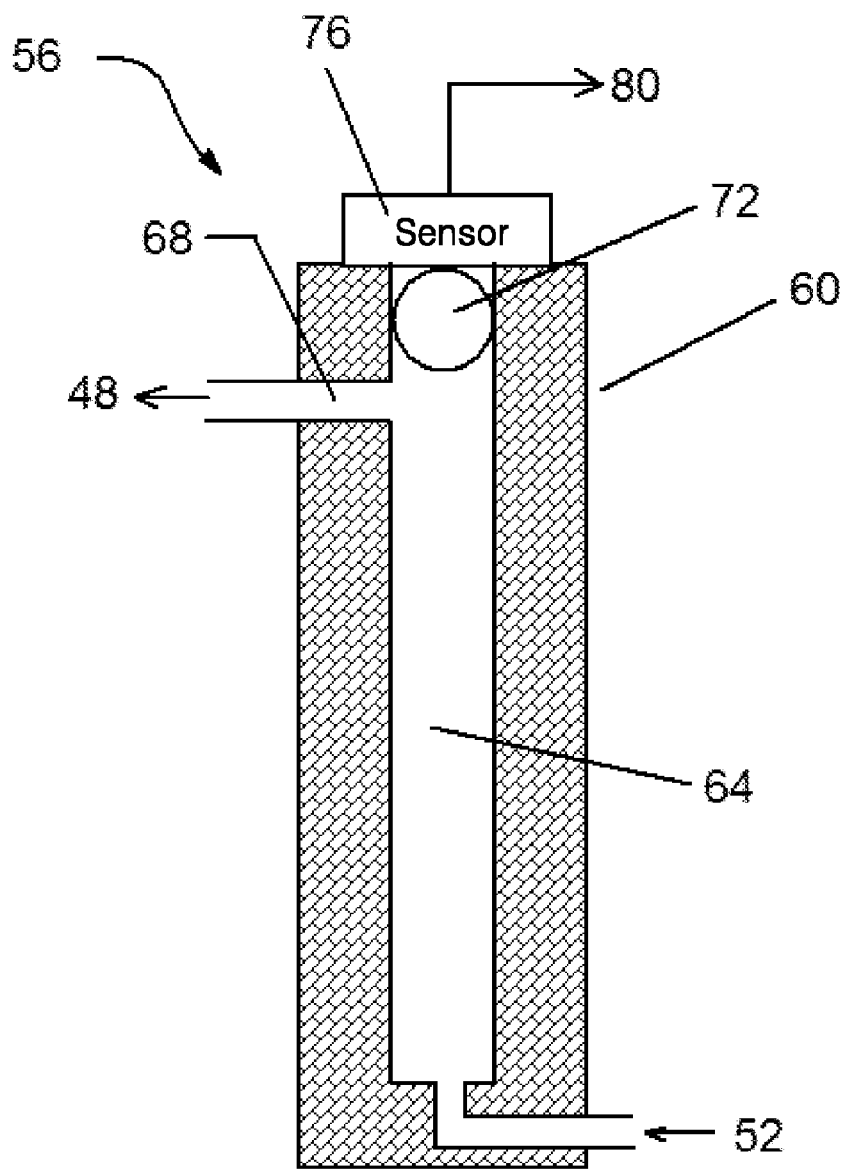
FIG. 2 shows a section through a switch assembly used in the assembly fixture and part detection system of FIG. 1 with the switch assembly being in a first state.
Figure 3:
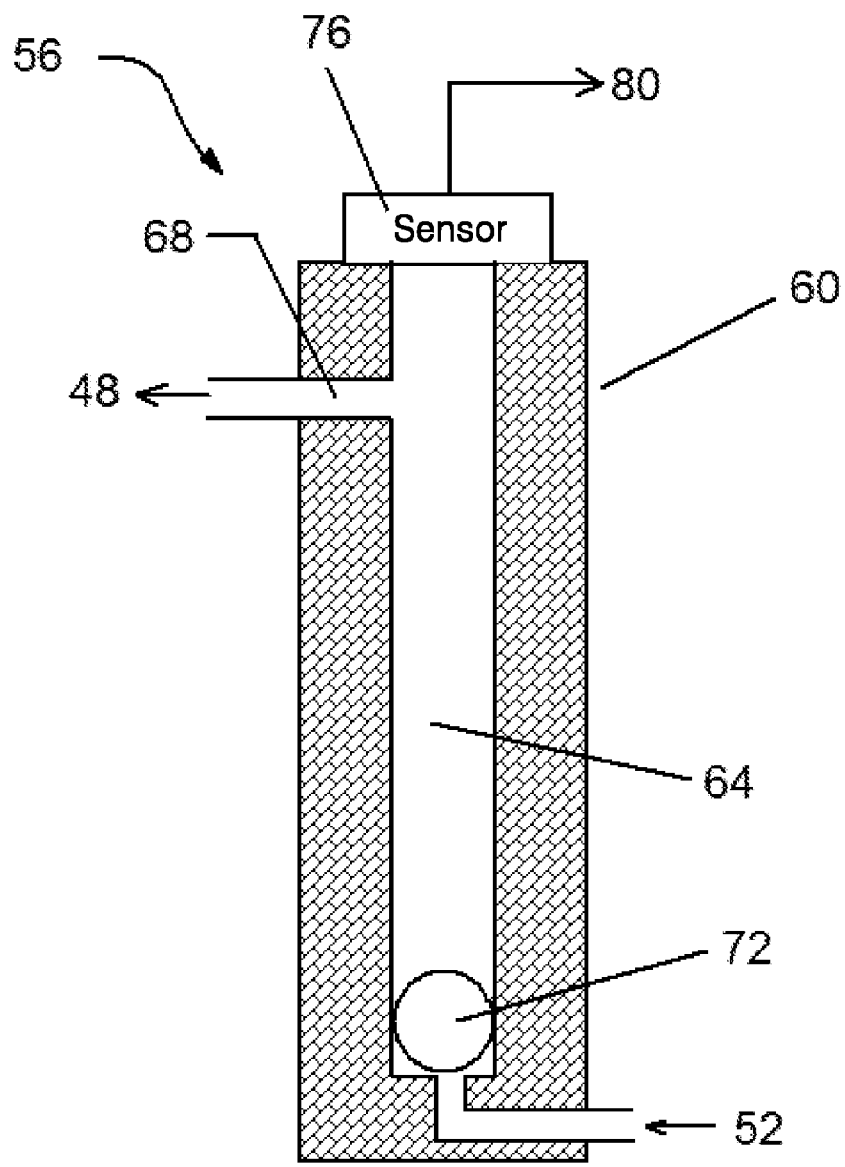
FIG. 3 shows the section of FIG. 2 with the switch assembly being in a second state.

A supply 48 of pressurized air is provided to pneumatic inlet 44 from a suitable source 52, such as a compressor, via switch assembly 56, which is shown in more detail in FIGS. 2 and 3. As shown, switch assembly 56 includes a body 60 with a substantially vertical bore 64 located therein. The lower end of bore 64 is connected to source 52 of pressurized air and bore 64 includes an outlet 68 adjacent its upper end through which supply 48 of pressurized air can pass.

A signal member, in this call a ball bearing 72, is located in bore 64 and closely fits the interior of bore 64. A sensor 76 is located adjacent the upper end of bore 64 and sensor 76 can be any sensor suitable for detecting the proximity of the signal member and can, for example, be a microswitch, an optical sensor or an inductive sensor (when signal member is a metal member, such as ball bearing 72). Sensor 76 outputs a signal 80 indicating the proximity of signal member 72 to sensor 76.

When pressurized air from source 52 flows into bore 64 and out of outlet 68 which, as discussed above, occurs when a component is missing from one or more of cavities 28, 32 and 36 or if a component is incorrectly loaded into one or more of cavities 28, 32 and 36, the airflow through bore 64 in switch assembly 56 lifts the signal member such that it moves adjacent sensor 76 as shown in FIG. 2 and sensor 76 outputs an appropriate signal 80 indicating an improper loading of assembly fixture 24.

If each cavity 28, 32 and 36 in assembly fixture 24 is correctly loaded with a part, then no airflow occurs through switch assembly 56 and the signal member is located at the bottom of bore 64, as illustrated in FIG. 3, and sensor 76 outputs an appropriate signal 80.

Figure 4:
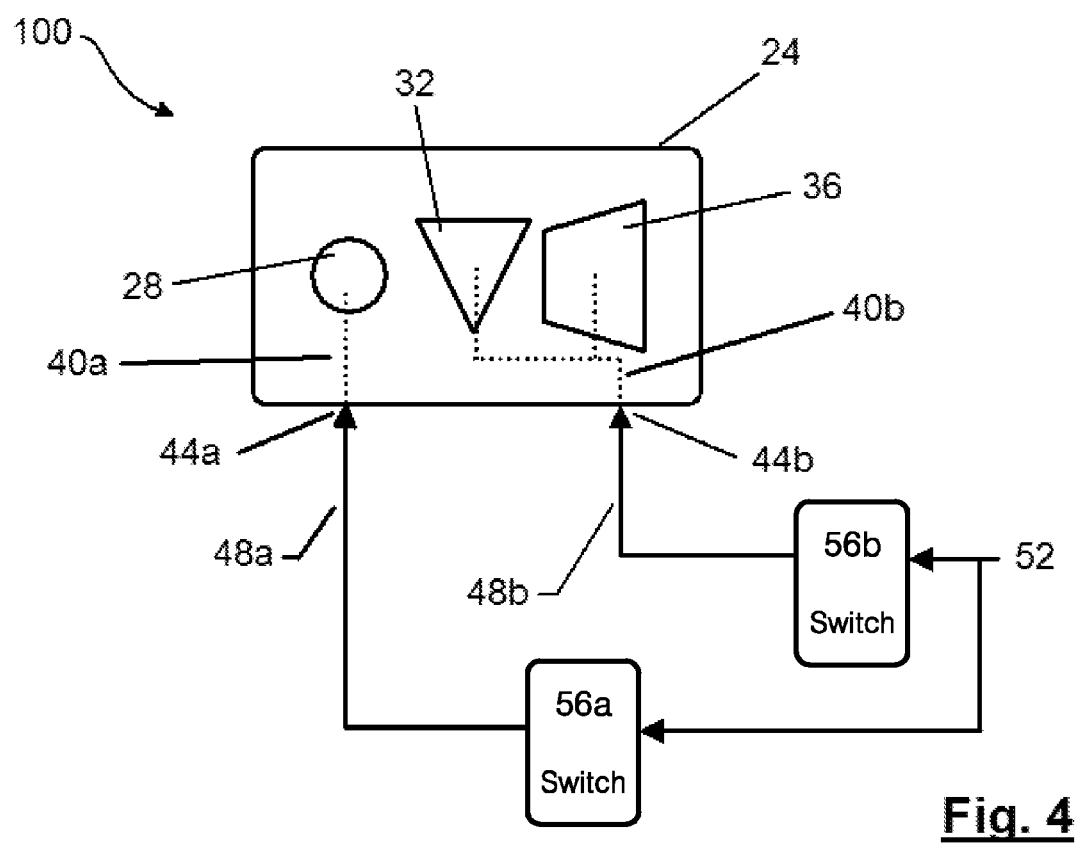
FIG. 4 shows a schematic representation of a second embodiment of an assembly fixture and part detection system in accordance with the present invention.

It is also contemplated that multiple instances of the present invention can be employed to detect the correct loading of individual parts, or groups of parts in an assembly fixture. FIG. 4 shows another embodiment of an assembly fixture and part detection system in accordance with the present invention which is indicated generally at 100, wherein like components to those of the embodiment of FIG. 1 are indicated with like reference numerals.

As illustrated, assembly fixture 24 includes two pneumatic circuits 40a and 40b which are respectively connected to two inlets 44a and 44b. Unlike the embodiment of FIG. 1 wherein pneumatic circuit 40 was connected to each cavity 28, 32 and 36 and to a single supply 48, in this embodiment pneumatic circuit 40a is connected only to cavity 28 and to a first supply 48a while pneumatic circuit 40b is connected to both of cavities 32 and 36 and to a second supply 48b.

Pressurized air from source 52 is provided to supply 48a via a first switch assembly 56a and pressurized air from source 52 is provided to supply 48b via a second switch assembly 56b. As should now be apparent, switch assembly 56a will provide a signal 80 indicating the correct loading of only cavity 28 while switch assembly 56b will provide a signal 80 indicating the correct loading of both of cavities 32 and 36. It is contemplated that this embodiment can be employed when all of the cavities 26, 32 and 36 of assembly fixture 24 are not loaded at the same time in the manufacturing process. For example, cavities 32 and 36 may be first loaded and a manufacturing or assembly operation performed on them prior to loading cavity 28 for a subsequent manufacturing or assembly operation.

Figure 5:
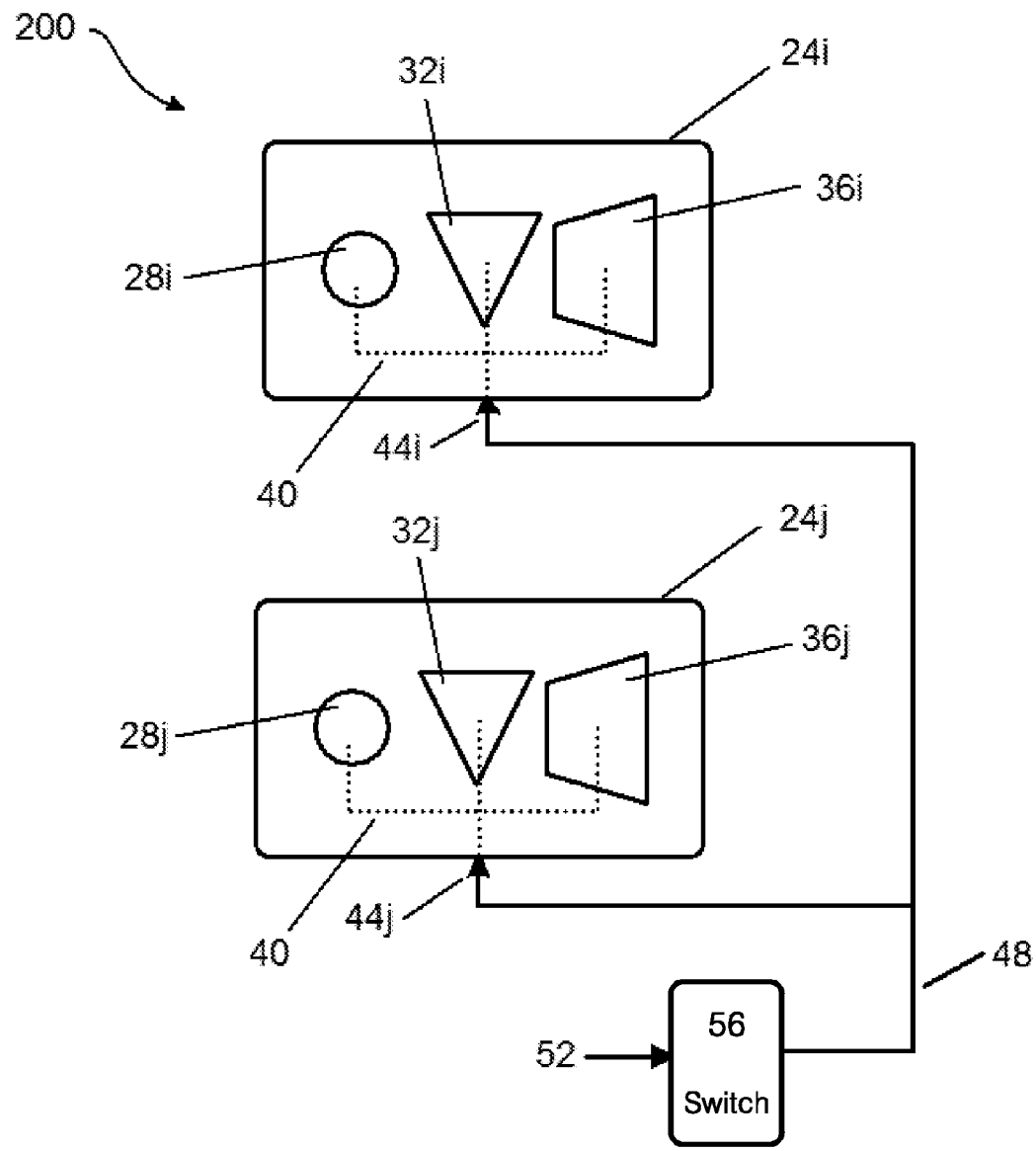
FIG. 5 shows a schematic representation of another embodiment of the present invention.

FIG. 5 shows another embodiment of an assembly fixture and part detection system in accordance with the present invention which is indicated generally at 200, wherein like components to those of the embodiment of FIG. 1 are indicated with like reference numerals.

As illustrated, system 200 includes two assembly fixtures 24i and 24j each of which has its respective pneumatic inlet 44i, 44j connected to source 52 via switch assembly 56. In this embodiment, if a part is omitted from, or incorrectly loaded into, any one or more of cavities 28i, 28j, 32i, 32j, 36i or 36j, switch assembly 56 will provide an appropriate signal indicating the incorrect loading of assembly fixtures 24i and 24j. As should also be apparent, a switch assembly 56 can be connected to more than two assembly fixtures 24 if desired.

The present invention is not limited to the configuration shown in FIGS. 1, 4 or 5 can any number or combination of cavities can be connected by a pneumatic circuit to a switch assembly as desired.

As is now apparent, the present invention provides a system and method of detecting the correct and complete loading of parts in an assembly fixture. A missing or incorrectly loaded part results in an airflow from a respective part cavity in the assembly fixture. A switch assembly, which can be located distal from the assembly fixture, detects the airflow and provides a signal indicating that the fixture is not correctly loaded. Conversely, if each and every part is correctly loaded into the assembly fixture, no airflow occurs and the switch assembly outputs a signal indicating that the assembly fixture is correctly loaded and that subsequent manufacturing/assembly operations can be performed.

By having the switch assembly located distal the assembly fixture, damage from assembly steps such as welding, impacts, etc. cannot damage the switch assembly. Further, by employing the described pneumatic system on the assembly fixture, an inexpensive, reliable and easily maintained sensing system is achieved. Also, the present invention allows for the detection of the correct loading of multiple parts into an assembly fixture with a single switch assembly, thus reducing costs.

The above-described embodiments of the invention are intended to be examples of the present invention and alterations and modifications may be effected thereto, by those of skill in the art, without departing from the scope of the invention which is defined solely by the claims appended hereto.

We claim:

1. A system for detecting the presence of one or more parts in an assembly fixture, comprising:
   an assembly fixture including at least one cavity to receive and retain parts to be assembled, each of the at least one cavities being complementary in shape to the respective parts they are to receive;
   a pneumatic circuit connecting the interior of said at least one cavity to an pneumatic inlet;

a source of pressurized air; and a switch assembly through which pressurized air from the source passes before entering the pneumatic circuit, the switch assembly having a signal member moveable from a first position to a second position when air flows through the switch assembly when a part is not loaded in, or is incorrectly loaded in, a respective cavity and the switch assembly including a sensor to indicate the presence of the signal member in the second position, wherein a shape of the part to be assembled conforms to the shape of the cavity when correctly loaded in the cavity to restrict a flow of air through the interior of the cavity.

2. The system of claim 1 wherein the assembly fixture includes at least two cavities and wherein the pneumatic circuit connects the interior of each of the at least two cavities to the pneumatic inlet.

3. The system of claim 1 comprising at least two switch assemblies and wherein the assembly fixture includes at least two cavities and each respective one of the at least two cavities is connected to a different respective pneumatic inlet and is supplied with pressurized air from the source through a respective switch assembly, each respective switch assembly indicating that a part is not loaded in, or is incorrectly loaded in, the respective cavity.

4. The system of claim 1 including at least two assembly fixtures, the pneumatic inlet of each assembly fixture being connected to the source of pressurized air through said switch assembly, said switch assembly providing an indication when a part is not loaded in, or is incorrectly loaded in, a cavity in either of said at least two assembly fixtures.

5. The system of claim 1 wherein the signal member is positioned within a vertically oriented bore.

6. The system of claim 5 wherein the signal member is located at a bottom of the bore when in the first position.

7. The system of claim 6 wherein the signal member is shaped as a ball.

8. The system of claim 1 wherein the sensor includes a proximity sensor operable to output a signal indicative of the position of the signal member.

9. The system of claim 1 wherein the part to be assembled restricts air flow into the cavity when correctly loaded in the cavity.

10. The system of claim 9 wherein a flow of air through the switch assembly is restricted when the part to be assembled is correctly loaded in the cavity.

11. A system for detecting the presence of a part in an assembly fixture, comprising:

an assembly fixture including a cavity to receive and retain a part to be assembled, the cavity being complementary in shape to the respective part it is to receive;

a source of pressurized air;

a pneumatic circuit connecting the interior of the cavity to the source of pressurized air; and a switch assembly including a body having a bore with first and second ends, the first end being in communication with an inlet on the body receiving pressurized air from the source, an outlet on the body being positioned between the first and second ends of the bore, a signal member being positioned within the bore and being moveable from the first end to the second end, and a sensor to indicate the presence of the signal member in the second position, wherein the pressurized air urges the signal member away from the first position, past the outlet and toward the second position when the part is not properly positioned within the cavity.

12. The system of claim 11 wherein the sensor is positioned at the second end of the bore.

13. The system of claim 12 wherein the bore is vertically oriented.

14. The system of claim 11 wherein the part to be assembled restricts air flow into the cavity when correctly loaded in the cavity.

15. The system of claim 14 wherein a flow of air through the switch assembly is restricted when the part to be assembled is correctly loaded in the cavity.

16. The system of claim 15 wherein the signal member includes a ball located at the first position when the part is properly positioned within the cavity.

\* \* \* \* \*